(12) United States Patent
Tham et al.

(10) Patent No.: US 11,470,244 B1
(45) Date of Patent: Oct. 11, 2022

(54) PHOTO CAPTURE INDICATION IN EYEWEAR DEVICES

(71) Applicant: Snap Inc., Santa Monica, CA (US)

(72) Inventors: Yu Jiang Tham, Los Angeles, CA (US); Jonathan M Rodriguez, II, Los Angeles, CA (US); Matthew Hanover, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/665,009

(22) Filed: Jul. 31, 2017

(51) Int. Cl.
*H04N 5/232* (2006.01)
*G02F 1/137* (2006.01)

(52) U.S. Cl.
CPC ......... *H04N 5/23222* (2013.01); *G02F 1/137* (2013.01); *H04N 5/23293* (2013.01)

(58) Field of Classification Search
CPC . H04N 5/23222; H04N 5/23293; G02F 1/137
See application file for complete search history.

(56) References Cited

U.S. PATENT DOCUMENTS

| | | | | |
|---|---|---|---|---|
| 5,541,656 | A * | 7/1996 | Kare | H04N 1/2112 348/333.02 |
| 8,428,453 | B1 * | 4/2013 | Spiegel | H04N 5/232935 396/299 |
| 9,258,480 | B2 * | 2/2016 | Ruben | H04N 5/232935 |
| 2001/0015760 | A1 * | 8/2001 | Fellegara | G03B 17/48 348/333.01 |
| 2002/0085843 | A1 * | 7/2002 | Mann | E03C 1/057 396/374 |
| 2004/0027467 | A1 * | 2/2004 | Shiga | H04N 5/2252 348/231.99 |
| 2005/0231599 | A1 * | 10/2005 | Yamasaki | G02B 3/14 348/207.99 |
| 2009/0174782 | A1 * | 7/2009 | Kahn | G02B 27/646 348/208.2 |
| 2014/0055633 | A1 * | 2/2014 | Marlin | H04N 5/232939 348/220.1 |
| 2014/0111670 | A1 * | 4/2014 | Lord | H04N 5/77 348/240.99 |
| 2014/0320399 | A1 * | 10/2014 | Kim | G02B 27/017 345/156 |
| 2015/0138417 | A1 * | 5/2015 | Ratcliff | H04N 5/23293 348/333.03 |
| 2015/0281577 | A1 * | 10/2015 | Ruben | G06F 3/041 348/220.1 |
| 2018/0084054 | A1 * | 3/2018 | Bertin | B60C 23/0447 |

* cited by examiner

*Primary Examiner* — Timothy J Henn
(74) *Attorney, Agent, or Firm* — Schwegman Lundberg & Woessner, P.A.

(57) ABSTRACT

An eyewear device automatically provides an indication of photo capture by, substantially simultaneously with the capturing of a photo by a camera incorporated in the eyewear device, momentarily changing an optical characteristic of a pair of lenses forming part of the eyewear device. The photo capture indication can be by momentarily decreasing transparency of the pair of lenses such as more or less to mimic the visual effect observed in the viewfinder of an SLR camera during image capture.

16 Claims, 7 Drawing Sheets

PHOTO CAPTURE INDICATION IN EYEWEAR DEVICES

BACKGROUND

Some electronics enabled eyewear devices, also known as smart devices, have integrated cameras. A user can typically trigger the capture of digital photographs or pictures with the integrated camera via a trigger mechanism such as, for example, a pushbutton forming part of the smart glasses.

In many such cases, there can be a delay between button press and photo capture. As a result, the user may not always be aware exactly if or when an image has been captured subsequent to a user command to do so. Some existing smart devices provide for an indication of photo capture that is visible to the wearer of the smart devices, for example by a blink or flash of an LED lamp mounted within peripheral view of the wearer.

BRIEF DESCRIPTION OF THE DRAWINGS

Various ones of the appended drawings illustrate merely example embodiments of the present disclosure and should not be considered as limiting its scope.

DETAILED DESCRIPTION

The description that follows discusses illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

One aspect of the disclosure provides for, at a camera enabled eyewear device, indicating the capturing of an image by producing a simulated visual shutter-effect for viewing by a wearer of the eyewear device.

The visual shutter-effect in some embodiments simulates the visual effect observed when looking through the viewfinder of a single lens reflex (SLR) camera during the taking of a photograph with the SLR camera. In this manner, an intuitively understandable photo-capture identification or notification is provided to the wearer, allowing the wearer more effectively to assess and time the capturing of digital photographs by use of the eyewear device.

In some embodiments, the simulated shutter-effect comprises transient or momentary variation in an optical characteristic of an optical element incorporated in the eyewear device to be held within view of the wearer during use of the eyewear device. In some embodiments, the optical element is provided by a pair of lenses, the shutter-effect comprising a reduction in transparency (e.g., a momentary darkening or increase in opacity) of the lenses. In other embodiments, the optical element may be provided by a near eye display, the shutter effect comprising a temporary lowering in luminosity (e.g., a momentary dimming) of the display.

In one embodiment, a photo indication system forming part of the eyewear device comprises a liquid crystal shutter mechanism incorporated in the pair of lenses to cause an increase in opacity (i.e., a decrease in optical transmissivity or transparency) of the pair of lenses responsive to application of a voltage difference across the liquid crystal shutter mechanism. The liquid crystal shutter mechanism in one embodiment is disposable between a deactivated mode in which the pair of lenses has a default opacity level, and an activated mode in which the pair of lenses has an increased opacity level relative to the default opacity (thus being less transparent in the active mode than in the default mode). Provision of the simulated shutter-effect in such cases comprises disposing the liquid crystal shutter mechanism to the activated mode for a predefined shutter period, and thereafter returning the shutter mechanism to the deactivated condition. In some embodiments, the activated mode increases opacity (i.e., reduces transmissivity) of the lenses by between 20 and 50%, in a particular embodiment by about 30%. In other embodiments, the increased opacity level provides for rendering the lenses substantially opaque.

In some embodiments, the device has a trigger mechanism enabling the user to trigger photo capture by the camera, with a nontrivial delay between user activation of the trigger mechanism and the resultant image-capture. For example, the trigger mechanism in some embodiments comprises a trigger button mounted on a body of the eyewear device. After pressing of the button, an images is captured by the camera after a nontrivial interval or trigger delay. The visual photo capture indication is in such instances timed to be substantially synchronized with the moment of photo capture, thus being spaced from the user activation of the camera trigger mechanism by a time substantially equal to the trigger interval.

A benefit of a device or method according to this aspect of the disclosure is that the user is notified in an intuitive and non-invasive manner of the precise instance at which a photo is taken subsequent to a button press for taking the photo.

Figure 1:
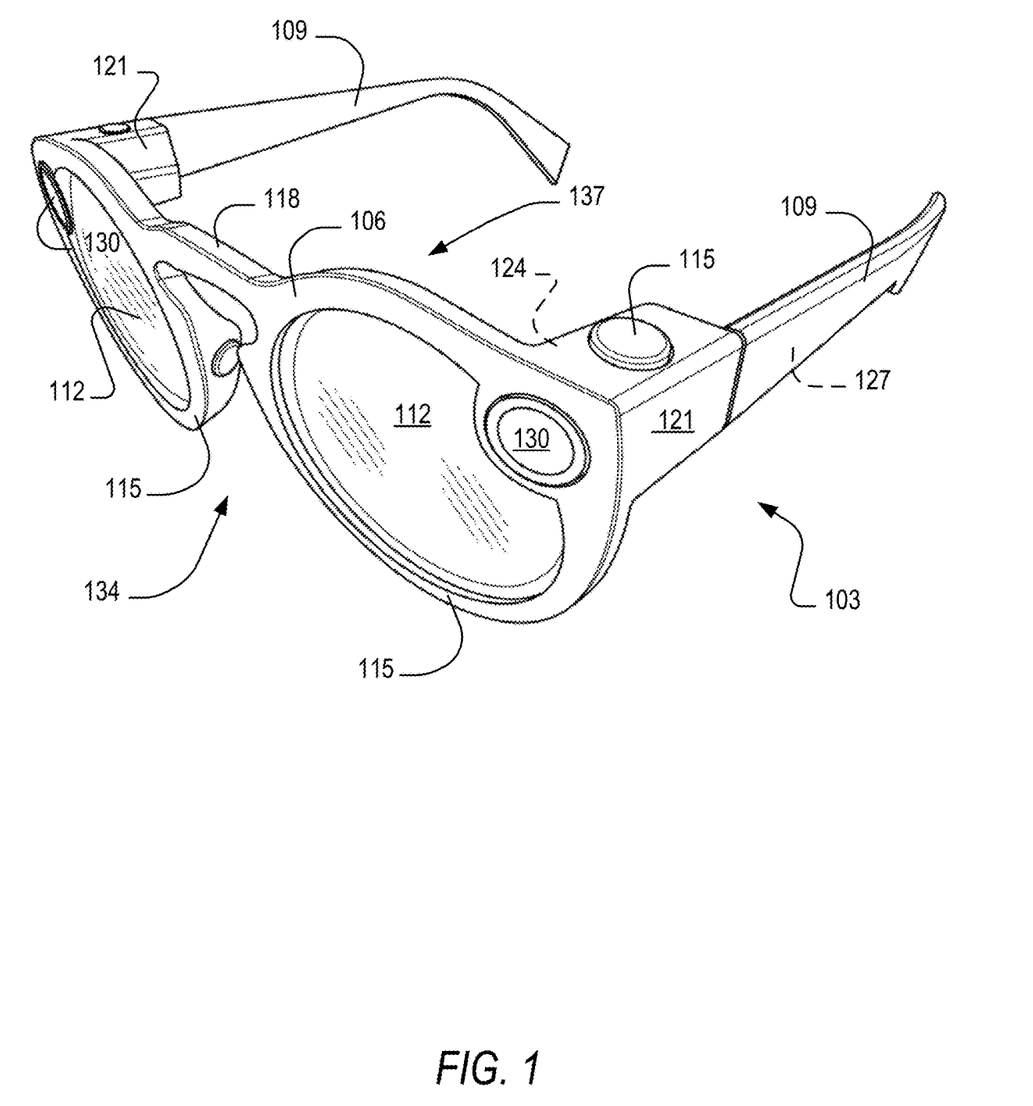
FIG. 1 is a perspective view of an eyewear device according to an example embodiment.

FIG. 1 shows a front perspective view of an eyewear device in the form of a pair of smart glasses 100 that include an integrated photo capture indication system according to one example embodiment. The glasses 100 include a body 103 comprising a front piece or frame 106 and a pair of temples 109 connected to the frame 106 for supporting the frame 106 in position on a user's face when the glasses 100 are worn. The frame 106 can be made from any suitable material such as plastics or metal, including any suitable shape memory alloy.

The glasses 100 have a pair of optical elements in the form of a pair of lenses 112 held by corresponding optical element holders in the form of a pair of rims 115 forming part of the frame 106. The rims 115 are connected by a bridge 118. In other embodiments, one or both of the optical elements can be a display, a display assembly, or a lens and display combination.

The frame 106 includes a pair of end pieces 121 defining lateral and portions of the frame 106. In this example, a variety of electronics components are housed in one or both of the end pieces 121, as discussed in more detail below.

The temples 109 are coupled to the respective end pieces 121. In this example, the temples 109 are coupled to the frame 106 by respective hinges so as to be hingedly movable between a wearable mode (as shown in FIG. 1) and a collapsed mode in which the temples 109 are pivoted towards the frame 106 to lie substantially flat against it. In other embodiments, the temples 109 can be coupled to the frame 106 by any suitable means, or can be rigidly or fixedly secured to the frame 106 so as to be integral therewith.

Each of the temples 109 includes a front portion of that is coupled to the frame 106 and any suitable rear portion for coupling to the ear of the user, such as the curves or cute piece illustrated in the example embodiment of FIG. 1.

In some embodiments, the frame 106 is formed of a single piece of material, so as to have a unitary or monolithic construction. In some embodiments, the whole of the body 103 (including both the frame 106 and the temples 109) can be of the unitary or monolithic construction.

The glasses 100 has onboard electronics components including a computing device, such as a computer 124, which can in different embodiments be of any suitable type so as to be carried by the body 103. In some embodiments, the computer 124 is at least partially housed in one or both of the temples 109. In the present embodiment, various components of the computer 124 are housed in the lateral end pieces 121 of the frame 106. The computer 124 includes one or more processors with memory, wireless communication circuitry, and a power source. The computer 124 comprises low-power circuitry, high-speed circuitry, and, in some embodiments, a display processor. Various embodiments may include these elements in different configurations or integrated together in different ways.

The computer 124 additionally includes a battery 127 or other suitable portable power supply. In one embodiment, the battery 127 is disposed in one of the temples 109. In the glasses 100 shown in FIG. 1, the battery 127 is shown as being disposed in one of the end pieces 121, being electrically coupled to the remainder of the computer 124 housed in the corresponding end piece 121.

The glasses 100 is camera-enabled, in this example comprising a camera 130 mounted in one of the end pieces 121 and facing forwards so as to be aligned more or less with the direction of view of a wearer of the glasses 100. The camera 130 is configured to capture digital images (also referred to herein as digital photographs or pictures) as well as digital video content. Operation of the camera 130 is controlled by a camera controller (see, e.g. item 208 in FIG. 2) provided by the computer 124, image data representative of images or video captured by the camera 130 being temporarily stored on a memory forming part of the computer 124. In some embodiments, the glasses 100 can have a pair of cameras 130, e.g. housed by the respective end pieces 121.

As will be described in greater detail below, the onboard computer 124 and the lenses 112 are configured together to provide a photo capture indication system (see FIG. 2) that automatically produces a visual photo capture indication comprising a brief shuttering of the lenses 112. As will be discussed below with reference to FIG. 2, the photo indication system in this example comprises a liquid crystal shutter mechanism incorporated in the lenses 112.

The glasses 100 further include one or more input and output devices permitting communication with and control of the camera 130. In particular, the glasses 100 include one or more input mechanisms for enabling user control of one or more functions of the glasses 100. In this embodiment, the input mechanism comprises a button 115 mounted on the frame 106 so as to be accessible on top of one of the end pieces 121 for pressing by the user. In addition to any other functions that may be controlled by operation of the button 115, the button 115 in this example provides a photo trigger mechanism 204 (see FIG. 2) enabling the user to trigger photo capture by the camera 130. In the current example embodiment, a photo capture command can be issued by a single, relatively short button press (e.g., shorter than a second), while a video capture command can be issued by a press-and-hold action.

Figure 2:
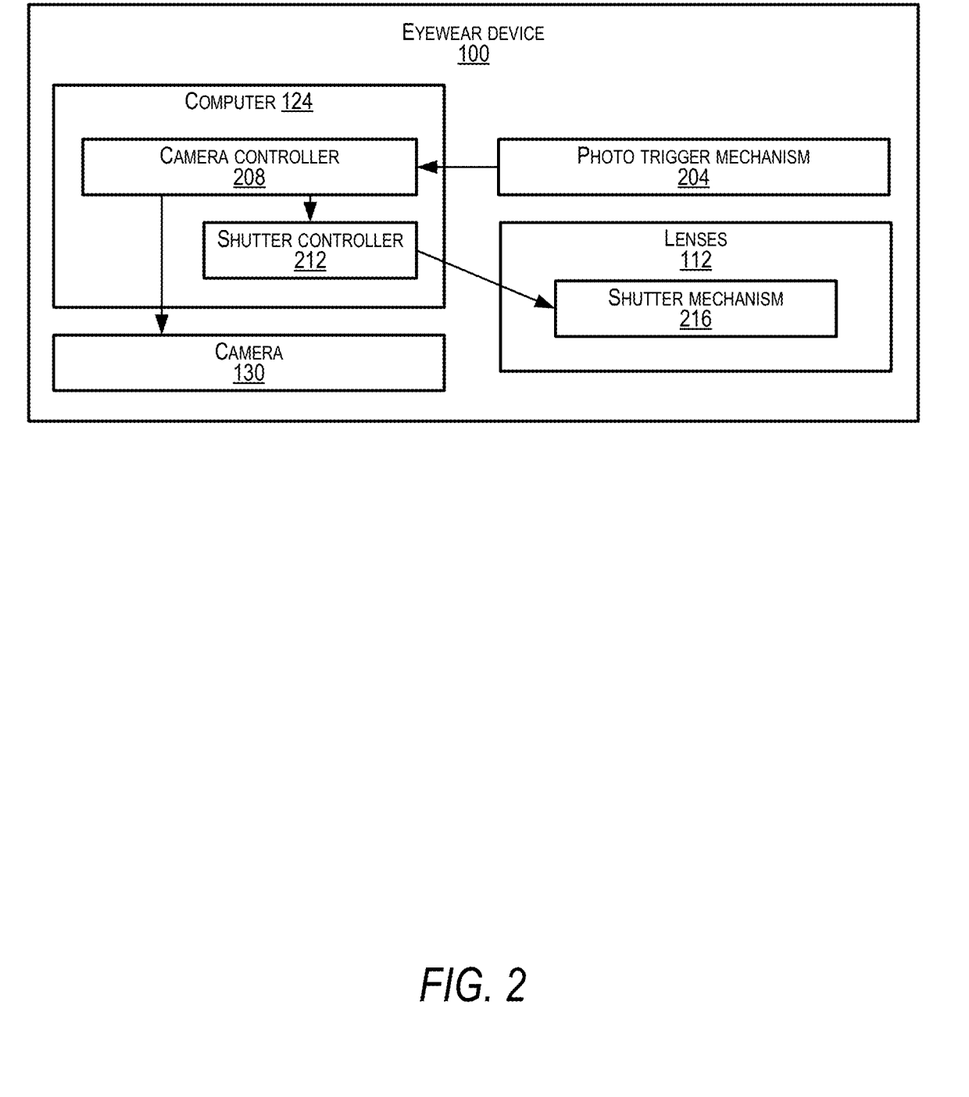
FIG. 2 is a schematic block diagram of a photo capture indication system forming part of an eyewear device according to an example embodiment.

Turning now to FIG. 2, therein is shown a schematic diagram of selected components of the glasses 100 pertaining to the disclosed provision of an active photo capture indication.

As shown in the diagram of FIG. 2, a photo trigger mechanism 204 that is activatable by pressing of the button 115 is communicatively coupled to a camera controller 208 forming part of the onboard computer 124. In this example, the camera controller 208 comprises a commercially available camera processor provided by Ambarella Inc. The camera controller 208 is in turn in communication with the camera 130 to cause photo capture resultant to activation of the photo trigger mechanism 204 via the button 115. The camera controller 208 is also coupled to a shutter controller 212 (which may in some cases form part of the camera controller 208) configured to cause activation of a shutter mechanism 216 substantially synchronously with the capturing of a photograph by the camera 130.

In this embodiment, the shutter mechanism 216 functions similarly to those in existing active shutter 3-D systems, in which liquid crystal shutter glasses are employed. Each lens 112 contains a liquid crystal layer which has the property of becoming more opaque when the voltage is applied thereto, being otherwise more transparent. The shutter controller 212 thus causes shuttering of the lenses 112 by application of voltage to the liquid crystal layer for a predefined shutter period. More on this below with reference to FIG. 5. In this example embodiment, the shutter mechanism 216 is configured to increase the opacity of the lenses 112 to an opacity level about 30% more opaque (i.e., 30% less optically transmissive) during the shutter period than is the case immediately before and after the shutter period.

Figure 3:
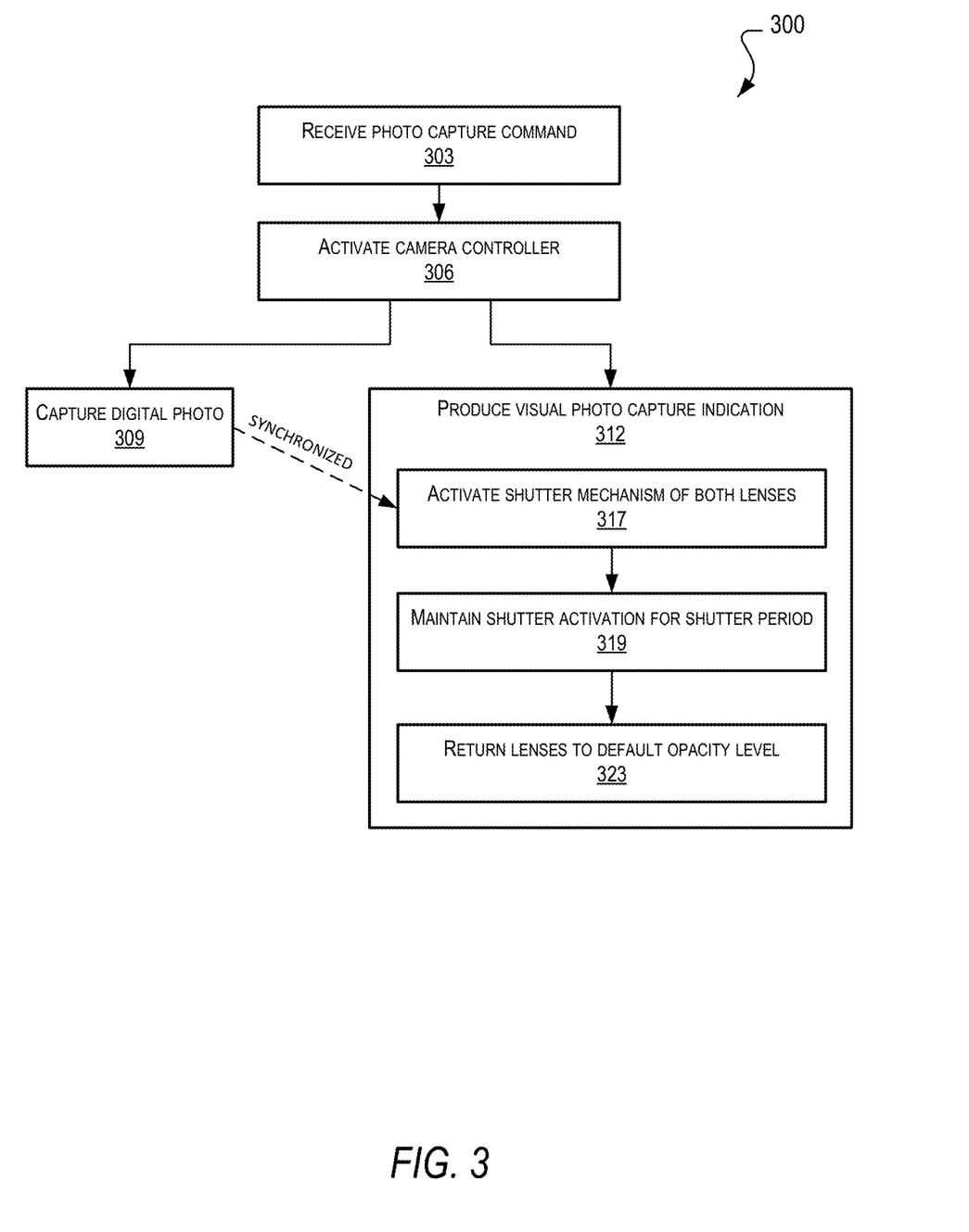
FIG. 3 is a flowchart illustrating a method of providing a photo capture indication in an eyewear device, according to an example embodiment.
Figure 4A:
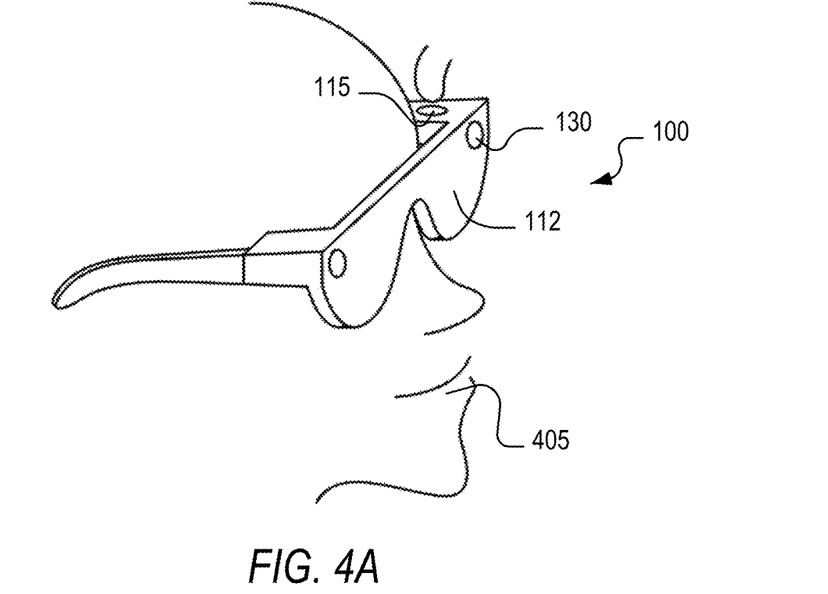
FIGS. 4A and 4B respective schematic views of an eyewear device according to an example embodiment, showing the eyewear device in a default condition (FIG. 4A) and during provision of a photo capture notification (FIG. 4B).
Figure 4B:
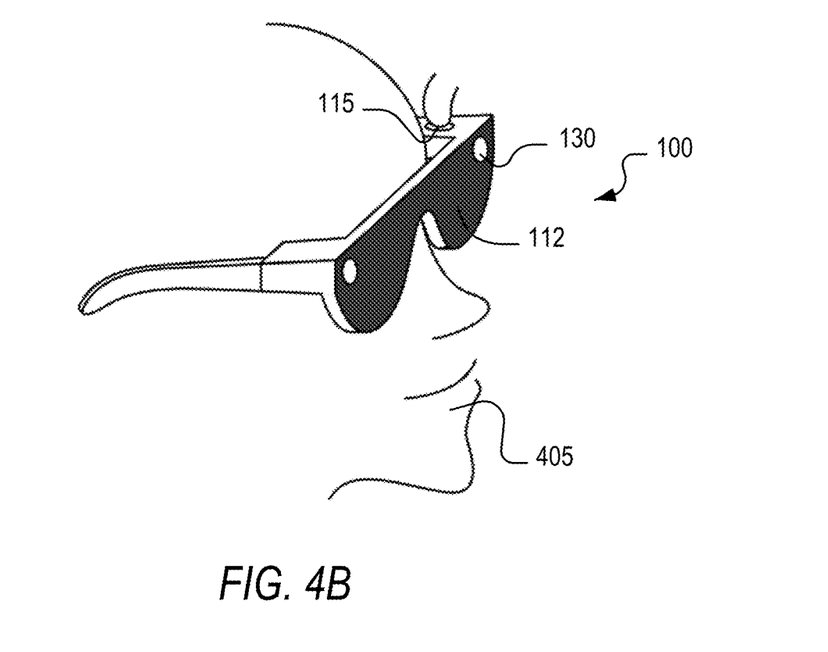

FIG. 3 shows a flowchart 300 illustrating a method of operating an eyewear device (in this example the glasses 100) according to one example embodiment. The method of flowchart 300 will be described below at the hand of FIGS. 4A and 4B (which show the glasses in a default condition and in a photo capture indication mode, respectively), and FIG. 5 (which shows a schematic timing diagram). The various operations forming part of the flowchart 300 performed while a user 102 wears the smart glasses 100 according to the present example embodiment, shown schematically in FIG. 4A. Operations of the button 115, the lenses 112, and the camera controller 208 are illustrated by respective activity lines in the timing diagram 500 of FIG. 5.

Initially (e.g., t=0 in the diagram 500 of FIG. 5) the camera controller 208 is in a passive mode, the lenses 112 are in a default condition in which they have a default opacity (in this example being substantially transparent), and the button 115 is undepressed. At operation 303 (FIG. 3), a photo capture command is received, in this example comprising pressing of the button 115 (e.g., at t=100 ms in FIG. 5). Note that the photo capture command is for clarity of description shown in FIG. 3 to comprise mere pressing of the button 115 (i.e., at t=100 ms in diagram 500). Strictly, however, the photo capture command in this example embodiment is executed by holding of the button 115 after press, and releasing it shortly thereafter, e.g., at t=340 seconds in the diagram 500. After pressing of the button 115, the camera controller 208 is, at operation 306, I switched to an activated mode, e.g. at about t=110 ms in diagram 500. As mentioned, the button 115 is released by the user 102 at about t=340 ms, completing the photo capture command in this example.

Figure 5:
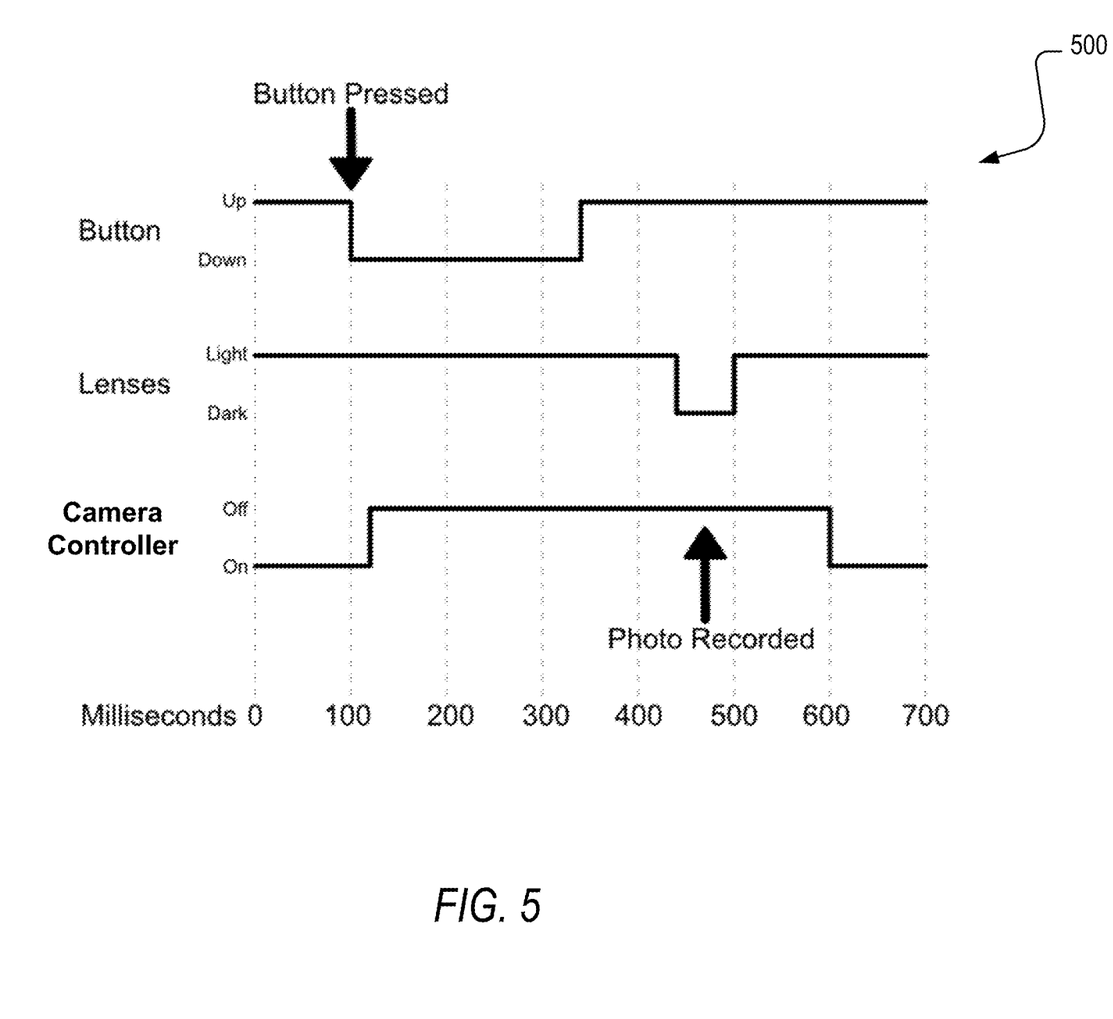
FIG. 5 is a timing diagram showing operation of a photo capture indication system forming part of an eyewear device according to an example embodiment.

Thereafter follows a nontrivial trigger delay (in this example about 100 ms) before substantially synchronous or simultaneous photo capture by the camera 130, at operation 309 (FIG. 3), and production of the visual photo capture indication, at operation 312. Synchronicity of photo capture and photo capture indication via the lenses 112 is indicated in timing diagram 500 as occurring in a time range centered about t=470 ms.

Production of the photo capture indication is shown in greater detail under item 312 in FIG. 3. At first, the lenses are at default opacity, as shown schematically in FIG. 4A. At operation 317, the shutter mechanism of the lenses 112 are activated, causing about 30% increase in opacity of the lenses 112.

In diagram 500 of FIG. 5, the shuttering operation 317 is performed at about t=430 milliseconds. As shown schematically in FIG. 4B, the lenses 112 are thus darkened or dimmed. Note that the schematic drawing of FIGS. 4A and 4B for ease of illustration shows the one or more optical elements of the eyewear device as a single, continuous lens (as may indeed be the case in some embodiments) instead of as separate lenses 112 as is in fact the case in the described example embodiment.

At operation 319 (FIG. 3), the activation of the liquid crystal shutter mechanism 216 is maintained for a predetermined shutter period. As shown schematically in the diagram 500 of FIG. 5, the shutter period is in this example 60 ms in duration.

At expiry of the shutter period (t=500 ms in FIG. 5), the shutter mechanism 216 is deactivated, at operation 323 (FIG. 3), thereby returning the lenses 112 to the default level of opacity or optical transmissivity.

Note that the digital photo capture by the camera 130 (e.g., by exposure of a charge coupled device to instant flight for an exposure period) is in this example timed such that the exposure period falls entirely within the shutter period of the lenses 112. In other embodiments, the exposure period may only partially overlap the shutter period of the photo capture indication produced by the lenses' shutter mechanism 216. In yet further embodiments, the shutter period and the exposure period may be non-overlapping yet substantially synchronous. In this context substantial synchronicity means being spaced in time by no more than 100 ms. It is emphasize, however, that the 60 ms shutter period in many embodiments at least partially overlaps the exposure period of photo capture.

From the above description, it can be seen that production of the photo capture indication by dimming of the lenses 112 provides an intuitively understandable, readily perceptible, and minimally intrusive mechanism for apprising the user 102 of the precise moment (at least as far as human perception is concerned) at which digital photos are captured by the glasses 100. In particular, the shuttering of the lenses 112 in synchronicity with photo capture mimics or simulates the visual effect of taking a photograph with an SLR camera while looking through the camera's viewfinder.

Example Machine and Hardware Components

The example eyewear device described above may incorporate various computer components or machine elements, at least some of which are configured for performing automated operations and/or for automatically providing various functionalities. These include, for example, functionalities provided by the photo capture indication system of glasses 100. As discussed previously, the glasses 100 may provide an independent computer system. Instead, or in addition, the glasses 100 may form part of a distributed system including on ore more off-board processors and/or devices. It is to be understood that the description of example hardware and software architecture and components applies to some embodiments of electronics-enabled eyewear devices in isolation, to off-board components co-operating with such eyewear devices, or to such an eyewear device and supporting off-board components in combination, as the case may be. In this context, it is to be understood that, in some embodiments, software such as that described with reference to FIG. 6 may execute on hardware such as that described with reference to FIG. 7 to provide components such as the camera controller 208, the shutter controller 212, the photo trigger mechanism 204, and the shutter mechanism 216 of FIG. 2, with functionalities to perform a method such as that described with reference to FIG. 3.

Figure 6:
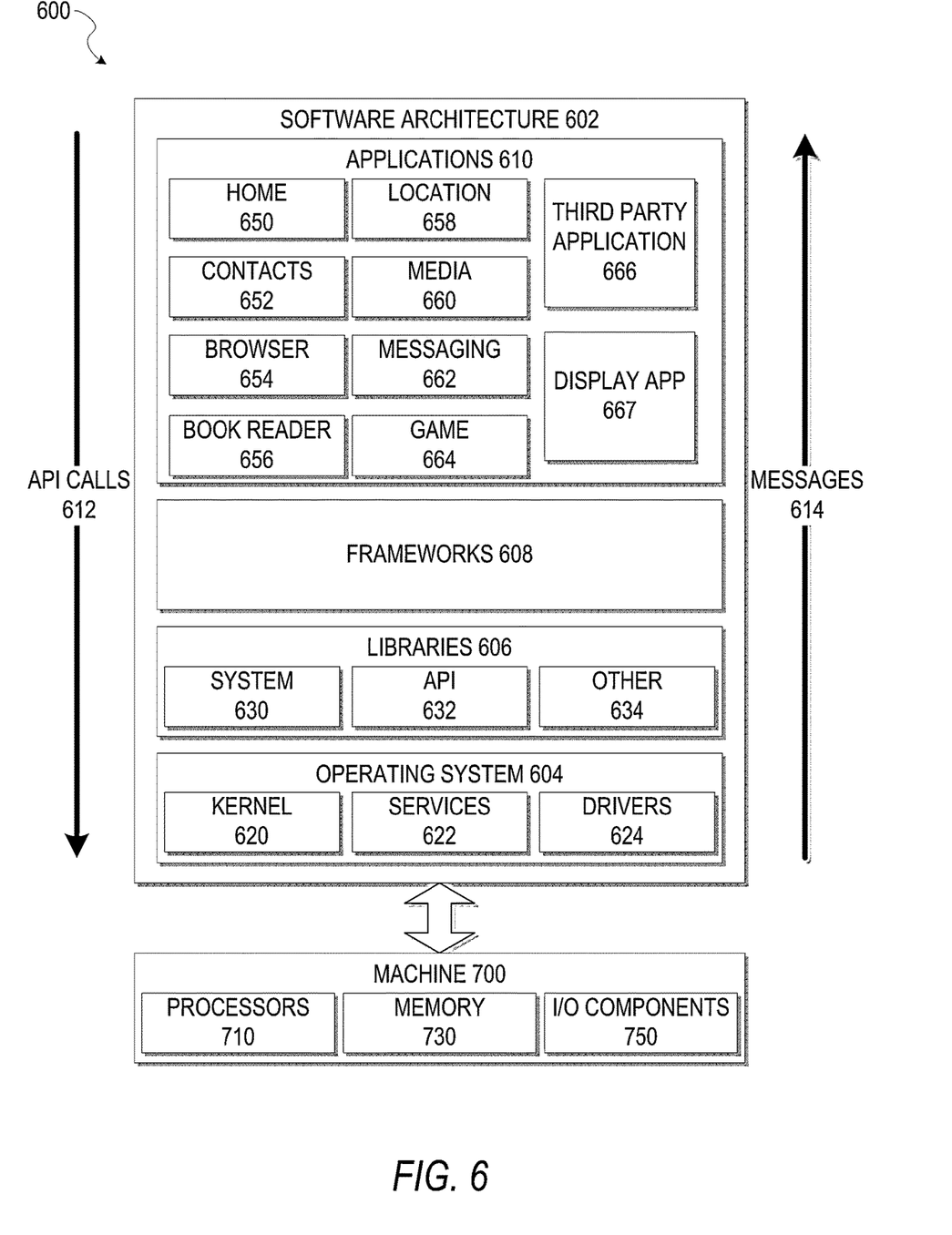
FIG. 6 is a block diagram illustrating an example of a software architecture that may be installed on a machine, according to some example embodiments.

FIG. 6 is a block diagram 600 illustrating an architecture of software 602, which can be installed on any one or more of the devices described above. FIG. 6 is merely a non-limiting example of a software architecture, and it will be appreciated that many other architectures can be implemented to facilitate the functionality described herein. In various embodiments, the software 602 is implemented by hardware such as machine 700 of FIG. 7 that includes processors 710, memory 730, and I/O components 750. In this example architecture, the software 602 can be conceptualized as a stack of layers where each layer may provide a particular functionality. For example, the software 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments. In various embodiments, any client device, server computer of a server system, or any other device described herein may operate using elements of software 602. Devices such as the computer system 152 and display mechanism 104, as described earlier, may additionally be implemented using aspects of software 602.

In various implementations, the operating system 604 manages hardware resources and provides common services. The operating system 604 includes, for example, a kernel 620, services 622, and drivers 624. The kernel 620 acts as an abstraction layer between the hardware and the other software layers consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth. In certain implementations, low-power circuitry may operate using drivers 624 that only contain BLUETOOTH® Low Energy drivers and basic logic for managing communications and controlling other devices, with other drivers operating with high-speed circuitry.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system or platform.

In an example embodiment, the applications 610 include a home application 650, a contacts application 652, a browser application 654, a book reader application 656, a location application 658, a media application 660, a messaging application 662, a game application 664, and a broad assortment of other applications such as a third party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 666 can invoke the API calls 612 provided by the operating system 604 to facilitate functionality described herein.

Figure 7:
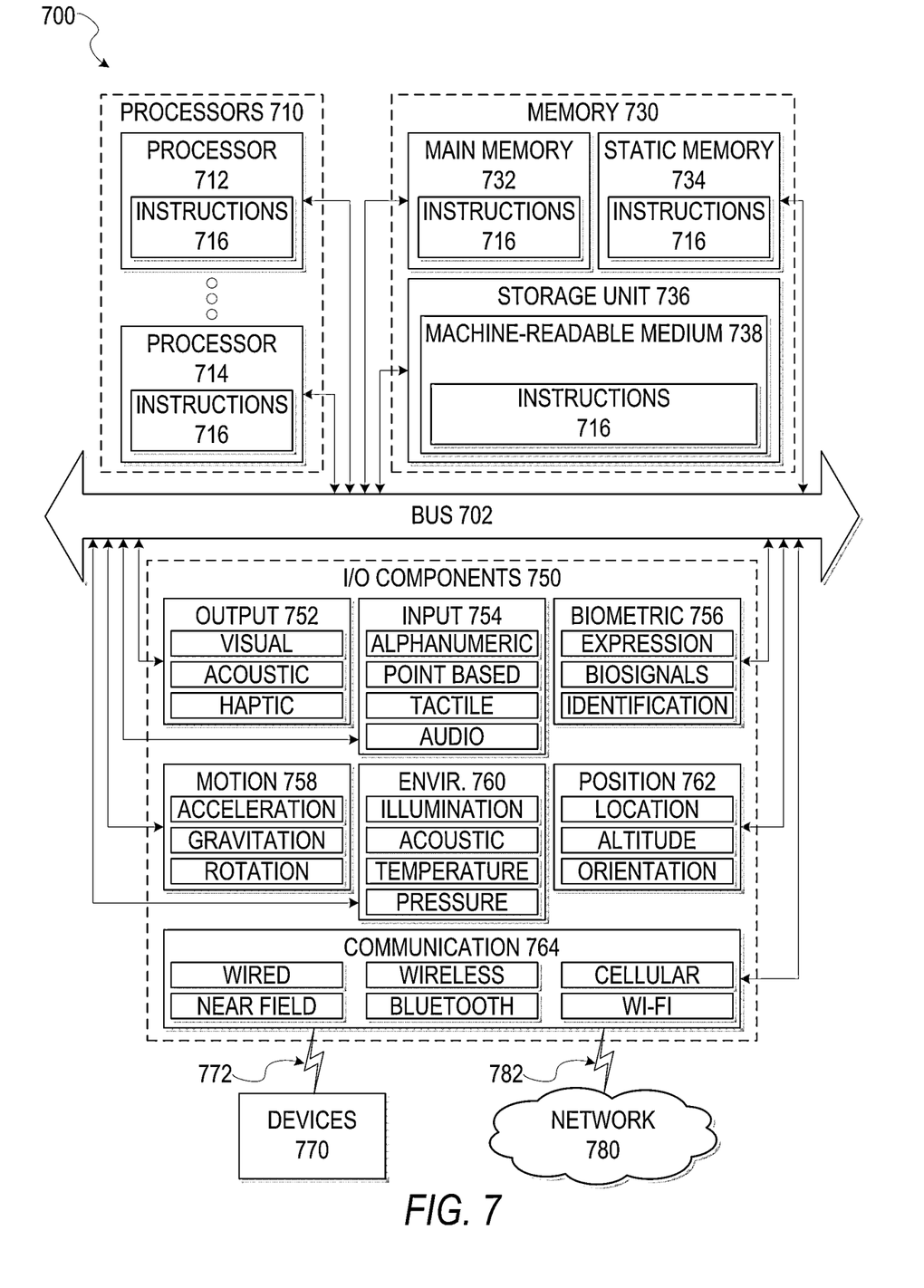
FIG. 7 illustrates a diagrammatic representation of a machine in the form of a computer system within which a set of instructions may be executed for causing the machine to perform any one or more of the methodologies discussed herein, according to an example embodiment.

Embodiments described herein may particularly interact with a display application 667. Such an application 667 may interact with I/O components 750 to establish various wireless connections with devices forming part of the glasses 100. Display application 667 may communicate with the display mechanism 104 to automatically control display of computer-generated information via display mechanism 104.

Certain embodiments are described herein as including logic or a number of components, modules, elements, mechanisms, or controllers. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a stand-alone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 712 and a processor 714 that may execute the instructions 716. The term "processor" is intended to include multi-core processors that may comprise two or more independent processors (also referred to as "cores") that can execute instructions contemporaneously. Although FIG. 7 shows multiple processors 710, the machine 700 may include a single processor with a single core, a single processor with multiple cores (e.g., a multi-core processor), multiple processors with a single core, multiple processors with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown in an example embodiment to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 770 may be another machine or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the medium 738 should be considered as being transportable from one physical location to another. Additionally, since the machine-readable medium 738 is tangible, the medium 738 may be considered to be a machine-readable device.

What is claimed is:

1. A eyewear device comprising:
   one or more optical elements;
   an eyewear body on which the one or more optical elements are mounted, the eyewear body being configured to be worn by a user such that the one or more optical elements are held within a field of view of the user;
   a camera carried by the eyewear body and configured for capturing digital photographs;
   a photo trigger mechanism comprising a button mounted on the eyewear body, video capture commands and photo capture commands both being providable by user-operation of the button, the photo trigger mechanism being a bimodal mechanism configured to register a button press signal upon user depression of the button, and to register a button release signal upon release of the button;
   a camera controller communicatively coupled to the camera, the camera controller being configured to perform operations comprising:
      by default being maintained in a passive mode during active wear of the eyewear device;
      automatically activating by switching from the passive mode to an activated mode responsive to, while the camera controller is in the passive mode, receiving a button press signal via the photo trigger mechanism;
      responsive to subsequent reception of a button release signal, causing performance by the camera of a photo capture event, the photo capture event being nonsynchronous with reception of the button release signal, being separated therefrom in time by a non-predefined trigger delay resulting from button-triggered activation of the camera controller; and
      at expiry of a sub-second interval subsequent to the photo capture event, automatically returning to the passive mode; and
   a photo indication system to provide to the user a visual photo capture indication substantially synchronously with the capture of a digital photograph by the camera, the visual photo capture indication comprising temporary variation in an optical characteristic of the one or more optical elements.

2. The eyewear device of claim 1, wherein:
   the one or more optical elements comprises one or more lenses that are at least partially transmissive, so that an ambient scene is visible to the user through the one or more lenses; and
   wherein the visual photo capture indication comprises temporary variation in transmissivity of the one or more lenses.

3. The eyewear device of claim 2, wherein the one or more lenses comprises a liquid crystal shutter mechanism forming part of the photo indication system and configured to increase opacity of the one or more lenses responsive to application of voltage thereto.

4. The eyewear device of claim 2, wherein the visual photo capture indication comprises disposing the one or more lenses to an increased opacity level for a predefined shutter period.

5. The eyewear device in claim 4, wherein the shutter period is less than one second.

6. The eyewear device in claim 4, wherein the shutter period is between 40 and 100 ms.

7. The eyewear device of claim 4, wherein the shutter period is about 60 ms.

8. The eyewear device of claim 1, wherein the one or more optical elements comprises a pair of lenses, the visual photo capture indication comprising shuttering of the lenses for a fraction of a second.

9. The eyewear device of claim 8, wherein the shuttering of the lenses is such as to mimic a shutter effect as seen through a viewfinder of a single lens reflex camera.

10. A method comprising:
    receiving a photo capture command via a bimodal photo trigger mechanism comprising a button integrated in an eyewear device and configured for operation exclusively in a depressed condition and a released condition, video capture commands and photo capture commands both being providable by user-operation of the button, video capture commands and photo capture commands being distinguished exclusively by the length of a holding interval defined by time elapsed between reception of a button press signal and subsequent reception of a button release signal;
    by default maintaining a camera controller forming part of the eyewear device in a passive mode during active wear of the eyewear device;
    upon receiving, while the camera controller is in the passive mode, the button press signal of the photo capture command, automatically activating the camera controller by switching the camera controller from the passive mode to an activated mode;
    responsive to receiving the button release signal of the photo capture command, by operation of the camera controller, causing a camera forming part of the eyewear device to capture a photograph, wherein the capturing of the photograph is non-synchronous with reception of the button release signal, being separated therefrom in time by a non-predefined trigger delay resulting from button-triggered activation of the camera controller;

producing a visual photo capture indication substantially synchronously with the capturing of the photograph, the visual photo capture indication comprising temporary variation in an optical characteristic of one or more optical elements incorporated in the eyewear device to be held within a field of view of a user when the device is worn; and at expiry of a sub-second interval subsequent to the visual photo capture indication, automatically returning the camera controller to the passive mode.

11. The method of claim 10, wherein:

the one or more optical elements comprises one or more lenses that are at least partially transmissive, so that an ambient scene is visible to the user through the one or more lenses; and wherein the visual photo capture indication comprises temporary variation in optical transmissivity of the one or more lenses.

12. The method of claim 11, wherein the one or more lenses comprises a liquid crystal shutter mechanism, the producing of the visual photo capture indication comprising increasing opacity of the one or more lenses by use of the liquid crystal shutter mechanism.

13. The method of claim 11, wherein the visual photo capture indication comprises disposing the one or more lenses to an increased opacity level for a predefined shutter period.

14. The method of claim 13, wherein the shutter period is about 60 ms.

15. The method of claim 13, wherein the one or more optical elements is between 25% and 35% more opaque at the increased opacity level, compared to a default opacity level before and after the photo capture indication.

16. The method of claim 10, wherein the one or more optical elements comprises a pair of lenses, the visual photo capture indication comprising shuttering of the lenses for a fraction of a second.

* * * * *